United States Patent Office 2,916,483

Patented Dec. 8, 1959

1

2,916,483

METHYMYCIN

James D. Dutcher, New Brunswick, Richard Donovick, Westfield, Leon J. Heuser, Princeton, Joseph F. Pagano, Bound Brook, and David Perlman, Princeton, N.J., assignors to Olin Mathieson Chemical Corporation, New York, N.Y., a corporation of Virginia No Drawing. Application March 27, 1956
Serial No. 574,096

9 Claims. (Cl. 260—210)

This application is a continuation-in-part of our parent application, Serial No. 305,802, filed August 22, 1952, and now abandoned.

This invention relates to a new antibiotic, methymycin, and its acid-addition salts, and to the production thereof. More particularly, it relates to the new antibiotic and to processes for producing it by fermentation, as well as concentrating and/or purifying it, isolating it and producing its acid-addition salts (especially salts with strong acids such as mineral acids). The new antibiotic of this invention has been termed "methymycin," and has in its free base form the empirical formula $C_{25}H_{43}O_7N$ and the structural formula

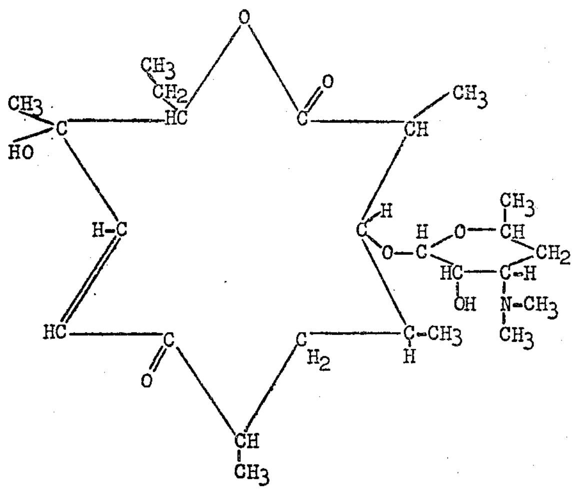

Methymycin is formed by culturing, under controlled conditions, at least one of two hitherto undescribed strains of *Streptomyces venezuelae*, one isolated from a soil sample obtained in Florence, Italy, and hereinafter referred to as *Streptomyces venezuelae* WC3627, and the other isolated from a soil sample obtained in Oswego, New York, and hereinafter referred to as *Streptomyces venezuelae* WC3629. A culture of the living organism in each case has been made part of the Waksman collection [WC], New Jersey Agricultural Experiment Station, New Brunswick, New Jersey, for maintenance and distribution and is available from that source for practice of this invention. [It is to be specifically understood that this invention is not limited to the use of these strains, or to microorganisms fully answering the description given herein, for the production of the antibiotic of this invention. Thus, the invention includes use of mutants produced from the described microorganisms by mutating agents such as X-radiation, ultraviolet radiation, nitrogen mustards, etc.].

Each of these strains may be isolated from plates containing yeast-beef agar medium and identified in an agar streak test by high activity against *Micrococcus pyogenes*

2 var. *aureus*, *Aerobacillus polymyxa* and *Klebsiella pneumoniae*. Each strain forms white-grey, sporogenous pulvinate, circular colonies on yeast-beef agar. A brown water soluble pigment is produced. The vegetative hyphae are hyaline non-septate, monopodially branched and of uniform diameter. The aerial hyphae are not spiralled and are differentiated from the vegetative mycelia in that they are stained by Sudan IV. Spores are coccoid in shape and approximately 1 micron in diameter.

The strains are capable of assimilating any of the following carbon compounds in a basal medium containing $(NH_4)_2SO_4$ as a source of nitrogen: rhamnose, xylose, glucose, galactose, mannose, maltose, dextrin, starch, glycerol, salicin, citrate and acetate; fructose, lactose and sorbitol support growth poorly; and growth is not supported by arabinose, sucrose, inulin, raffinose, dulcitol, inositol, mannitol, ammonium formate, or ammonium oxalate. In a basal medium containing starch as a source of carbon, the nitrogen-containing compounds, ammonium sulfate, sodium nitrite, sodium nitrate, l-asparagine and l-tyrosine, will support growth, while acetamide and d,l-tryptophane will not.

In addition to the above characteristics, these strains are identified by their ability to grow between about 20° C. and about 40° C. on yeast-beef, soybean meal and Sabouraud's agar; to reduce nitrates to nitrites; and to produce a dark brown diffusible pigment on all media supporting good growth. Poor growth is obtained on potato dextrose agar; and no growth is obtained on Czapek-Dox agar.

Following, in tabular form (Table I) are results obtained in fermentation using *Streptomyces venezuelae* WC3627, showing the activity against certain organisms, of the antibiotic produced. The term "du," as used in this specification, represents "dilution units," defined as the reciprocal of the highest dilution of the broth which completely inhibits the growth of a test organism, that organism being *Micrococcus pyogenes* var. *aureus* 209P unless otherwise specified.

TABLE I

| Media | pH | | Potency (du/ml.) | | | | | | B.C.G. | |
|---|---|---|---|---|---|---|---|---|---|---|
| | | | *Micrococcus pyogenes* var. *aureus* | | *Klebsiella pneumoniae* | | *Streptococcus pyogenes* C203 | | | |
| | Day 3 | Day 7 | Day 3 | Day 7 | Day 3 | Day 7 | Day 3 | Day 7 | Day 3 | Day 7 |
| Sabouraud | 6.7 | 8.4 | 154 | 25 | 35 | 35 | ----- | ----- | 20 | 10 |
| Soybean | 7.0 | 8.2 | <25 | <25 | ----- | ----- | 200 | <125 | ----- | ----- |
| Sabouraud | 5.0 | 6.7 | 100 | 150 | ----- | ----- | 2,500 | 2,500 | ----- | ----- |
| Do | 5.8 | 6.7 | 32 | 50 | ----- | ----- | 1,250 | 1,000 | ----- | ----- |

The isolated antibiotic of this invention has a high order of activity, its activity being comparable to that of chloramphenicol against Meningopneumonitis virus, higher than that of chloramphenicol against Rocky Mountain spotted fever, and at least two and one-half times that of penicillin against *Rickettsia rickettsii*. The antiviral and antibacterial effectiveness of methymycin in humans has not as yet been conclusively established.

The antibiotic of this invention, methymycin, is preferably produced by submerged aerated culture of the microorganisms but may also be produced by surface culture, with aeration provided by merely exposing the surface to a sterile air supply. In either case, sources of carbon for energy and nitrogen for growth are included in the nutrient medium.

As the energy-source material one may use: a carbohydrate, such as starch, soluble starch, dextrose, sucrose, and maltose; a sugar alcohol (e.g., glycerol); or a lipid, such as (1) a fat acid, (2) a fat, or (3) a mixture of such materials. Illustrative fats are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin; and illustrative fat acids are stearic, palmitic, oleic, lauric, linoleic and myristic acids. Preferred as the energy-source materials are the carbohydrates, especially dextrose.

The sources of nitrogenous, growth-promoting factors are those normally employed in such processes. They may be natural organics (e.g., soybean meal, corn steep liquor, meat extract, casein, fish meal, liver cake and/or distillers' solubles), or synthetics such as inorganic nitrates or ammonium compounds. Corn steep liquor, because of the wide variety of substances contained therein, is a valuable addition to the fermentation medium.

As in most fermentation processes, the process of the present invention is desirably carried out using a liquid medium containing mineral components enhancing growth of the organism, for example, sources of potassium, calcium, magnesium, sulfur, iron, other trace elements and phosphate. These components are desirably added to the medium unless already present therein as a component (e.g., impurity) of the crude carbon- or nitrogen-source material (e.g., corn steep liquor).

In large scale fermentation by submerged aerated culture, the pH of the medium is preferably adjusted, if necessary, to about 7 (although a pH about 5 to about 9 may be used) by the addition of buffering agents, the pH tending to become slightly alkaline (pH about 7.5–8.5) as fermentation proceeds. Fermentation temperatures from about 20° C. to about 40° C. may be used, with a temperature of about 25° C. preferred. The stirring may be effected by mechanical agitation at 100 or more r.p.m., with aeration at a superficial velocity up to about 3 or more meters per minute.

Small scale fermentation, for laboratory investigation or for the production of inoculae for larger fermentations, may be conducted in shaker flasks plugged with cotton. Thus, 250 ml. of an aqueous nutrient medium containing: soybean meal, 3%; dextrose, 2%; $CoCl_2 \cdot 6H_2O$, 0.005%; and $CaCO_3$, 0.1% is placed in a one-liter Erlenmeyer flask, sterilized in the usual manner (i.e., by autoclaving), then adjusted to pH 7.0 with 12 N NaOH. The medium is then inoculated with the growth on an agar slant (either yeast-beef or soy infusion) of *Streptomyces venezuelae* WC3627 or WC3629, and incubation is allowed to proceed for 48–96 hours on a reciprocating shaker oscillating at the rate of 140 one-inch-strokes per minute. Other media may be used, such as aqueous media containing: (A) beef extract, 0.15%; yeast extract, 0.15%; peptone, 0.5%; dextrose, 0.5%; sodium chloride, 0.35%; $K_2HPO_4$, 0.368%; $KH_2PO_4$, 0.132%; (B) cerelose, 1%; peptone, 1%; beef extract, 0.03%; yeast extract, 0.5%; and (C) dextrose, 4%; peptone, 1%.

The antibiotic of this invention may be obtained as a concentrate in acid-addition salt form of a strong acid (usually the hydrochloride or sulfate) by: (1) adjusting the pH of the acid culture-filtrate to about 9.5 (although a pH as low as about 7.5 may be used), extracting with a water-immiscible organic solvent, such as ethyl ether, butanol, amyl acetate or chloroform; (2) back-extracting the organic phase with aqueous acid (usually hydrochloric or sulfuric acid) at a pH 4 or less, preferably 2.5 or less; (3) neutralizing the aqueous extract to pH about 6.5–7.0; and (4) freeze-drying to obtain the concentrate. Alternatively, the solvent in the extract obtained by treatment of the alkalinized or neutralized culture-filtrate with the water-immiscible organic solvent may be distilled off in the presence of water, maintained at a slightly acid pH (about 6.5–7.0), and the residual aqueous solution then freeze-dried to obtain the concentrate. Treatment of the concentrate with alkali, of course, liberates the free base.

The isolated antibiotic, in the form of the crystalline free base, may be obtained from the concentrate (salt) by: (1) dissolving the concentrate (such as the hydrochloride) in water; (2) acidifying to pH about 2.0–4.0 (preferably about 3.5) and extracting with a water-immiscible organic solvent, such as ethyl ether, butanol, amyl acetate or chloroform to remove organic impurities; (3) alkalinizing the remaining aqueous solution to pH about 7.5–9.5 (preferably about 8.5); (4) re-extracting with fresh portions of the water-immiscible organic solvent; (5) allowing this solvent extract to evaporate in vacuo to a small volume; and then (6) adding a hexane fraction (e.g., petroleum ether, Skellysolve B) at least until precipitation begins. The crystalline product so obtained may be recrystallized from any one of a number of solvents or solvent-mixtures in which the antibiotic in free base form is only slightly soluble, such as chloroform-hexane mixture, aqueous methanol, ethanol or acetone, benzene-hexane mixture or isopropanol.

From the free (concentrate or crystalline) base, acid-addition salts may be prepared using standard methods. Thus, acid-addition salts with mineral acids may be prepared in aqueous solution or under anhydrous conditions, for example, by passing hydrogen chloride gas into a solution of the free base in an appropriate solvent. Salts of other acids, such as sulfuric, phosphoric, p-aminosalicylic, p-toluenesulfonic, methionine, sulfamic, acetic, propionic, lactic, citric, gluconic, lauric and oleic acids may be prepared.

The following chemical and physical properties of the antibiotic of this invention, methymycin, inter alia, have been determined:

A. *Stability of the antibiotic concentrate (obtained using Streptomyces venezuelae WC3627) in the culture filtrate.*—(*a*) At pH 7, approximately 73% of the antibiotic activity is destroyed in 15 minutes at 100° C.

(*b*) At pH 2, antibiotic activity is not destroyed in 15 minutes at 100° C.

(*c*) At pH 9.5, approximately 88% of the antibiotic activity is destroyed in 15 minutes at 100° C.

(*d*) On heating the culture filtrate (ultraviolet absorption maximum at 231 mμ) for 20 minutes with strong alkali (pH 11.0), the antibiotic activity is destroyed and a new ultraviolet absorption maximum at 288 mμ (measured in aqueous solution) is observed.

B. *Properties of crystalline free base.*—Countercurrent distribution in the system, ether:sodium phosphate buffer (M/2; pH 6.8), shows that the preparation is essentially homogeneous. The specific rotation measured in methanol is $[\alpha]_D^{25°}=+62°\pm2°$, concentration=0.67, in chloroform it is $[\alpha]_D^{23°}=+74°$, concentration=1.16. The crystalline free base is soluble in aqueous acid, methanol and chloroform; moderately soluble in ether, acetone and ethanol; slightly soluble in water; and insoluble in hexane. Measured in phosphate buffer at pH 6.0, the ultraviolet absorption curve shows a maximum at 230 mμ

$$E_{1\,cm.}^{1\%}=182$$

In methanol solution two maxima are observed: 223 mμ ($\epsilon$=10,500) and 322 mμ ($\epsilon$=47). After alkaline hydrolysis, two ultraviolet absorption maxima are detected, one at 235 mμ

$$E_{1\,cm.}^{1\%}=22$$

another at 295 mμ

$$E_{1\,cm.}^{1\%}=22$$

The infrared spectrum of the crystalline free base has been determined as a Nujol mull of the crystals. The data thus obtained are given below.

| Wavelength (μ) | Frequency (cm.$^{-1}$) | Wave-length (μ) | Frequency (cm.$^{-1}$) |
|---|---|---|---|
| 2.93 | 3,413 | 9.67 | 1,034 |
| 3.45 | 2,899 | 9.99 | 1,001 |
| 5.77 | 1,733 | 10.13 | 987 |
| 5.93 | 1,686 | 10.34 | 967 |
| 6.03 | 1,658 | 10.58 | 945 |
| 6.16 | 1,623 | 10.87 | 920 |
| 6.80 | 1,471 | 10.97 | 912 |
| 7.22 | 1,385 | 11.18 | 894 |
| 7.40 | 1,351 | 11.53 | 867 |
| 7.59 | 1,318 | 11.72 | 853 |
| 7.79 | 1,284 | 11.90 | 840 |
| 8.05 | 1,242 | 12.62 | 792 |
| 8.28 | 1,208 | 12.82 | 780 |
| 8.51 | 1,175 | 13.15 | 760 |
| 8.69 | 1,151 | 13.97 | 716 |
| 9.58 | 1,044 | 15.20 | 658 |

The crystalline free base gives negative Molisch, biuret, ninhydrin and ferric chloride tests, forms water-insoluble salts with picric acid, reinecke acid and phosphotungstic acid and, at the dropping-mercury electrode, shows a half-wave potential of −1.60 volts. Its solution in dilute acid readily decolorizes potassium permanganate solution, and its solution in carbon tetrachloride rapidly absorbs bromine.

Analysis (after drying the pure crystalline free base to constant weight in vacuo at 78° C.) is as follows:

Calculated for $C_{25}H_{43}O_7N$: C, 63.94; H, 9.23; N, 2.98; $N(CH_3)$, 6.4. Found: C, 63.70; H. 9.18; N, 2.99; $N(CH_3)$, 5.9.

Methymycin has the structural formula given hereinbefore.

The antibiotic of this invention has been found to be effective in preventing the propagation of numerous microorganisms. Following, the tabular form (Tables II and III), are the minimal inhibiting concentrations required to prevent growth of selected microorganisms, as revealed by "in vitro" studies using the dilution quantitative assay technique, with the antibiotic in the free-base form.

*Table II.—In vitro spectrum of methymycin*

| | MIC in γ/ml. | Medium[a] |
|---|---|---|
| A. Bacteria: | | |
| *Micrococcus pyogenes* var. *aureus* 209P. | 4.0 | Difco Penassay Broth. |
| *Klebsiella pneumoniae* | 4.0 | Do. |
| *Mycobacterium tuberculosis* B.C.G. | 63 | Kirchner's and Triton A-20.[b] |
| *Salmonella schottmülleri* | 1,000 | Difco Penassay Broth. |
| *Salmonella gallinarum* | 500 | Do. |
| *Escherichia coli* | 333 | Do. |
| *Aerobacter aerogenes* | 250 | Do. |
| *Pseudomonas aeruginosa* | >1,000 | Do. |
| *Proteus vulgaris* | 250 | Do. |
| *Shigella dysenteriae* | 167 | Do. |
| *Aerobacillus polymyxa* | 9 | Do. |
| *Corynebacterium diphtheriae* (intermedius). | 1 | Difco Brain Heart Infusion. |
| *Streptococcus pyogenes* C-203. | 0.6 | Do. |
| *Streptococcus faecalis* | 2.2 | Difco Penassay Broth. |
| *Sarcina lutea* | 1.1 | Do. |
| *Bacillus subtilis* (Waksman). | 7.8 | Do. |
| *Streptococcus cremoris* | 30 | Do. |
| *Streptococcus viridens* | 0.5 | Difco Brain Heart Infusion. |
| *Clostridium sporogenes* | 15 | Fluid Thioglycollate. |
| *Serratia marcescens* | 350 | Difco Penassay Broth Room Temperature. |
| *Flavobacter arborescens* | 6 | Do. |
| *Flavobacter devorans* | 6 | Do. |
| *Diplococcus pneumoniae*—type 1. | 0.4 | Brain Heart Infusion. |
| *Diplococcus pneumoniae*—type 2. | 0.4 | Do. |
| *Diplococcus pneumoniae*—type 3. | 0.08 | Do. |
| *Corynebacterium diphtheriae*—type *gravis*. | 2.0 | Do. |
| B. Fungi: | | |
| *Candida albicans* | >1,000 | Malt-Yeast Extracts Broth. |
| *Saccharomyces pastorianus* | >1,000 | Do. |
| *Aspergillus niger* | >1,000 | Do. |
| *Trichophyton mentagrophytes*. | >1,000 | Do. |

[a] Incubation temperature 37° C. unless otherwise noted.
[b] Triton A-20 is a surface-active agent, a 25% aqueous solution of an alkyl aryl polyether alcohol.

*Table III.—In vitro spectrum of crystalline methymycin*

| Bacteria | MIC in γ/ml. | Medium[a] |
|---|---|---|
| *Micrococcus pyogenes* var. *aureus* 209P. | 40.0 | Difco Penassay Broth. |
| *Klebsiella pneumoniae* | 3.2 | Do. |
| *Mycobacterium tuberculosis* B.C.G. | 1,875 | Kirchner's and Triton A-20.[b] |
| *Salmonella schottmülleri* | 1,250 | Difco Penassay Broth. |
| *Escherichia coli* | 312 | Do. |
| *Aerobacter aerogenes* | 1,875 | Do. |
| *Pseudomonas aeruginosa* | 1,875 | Do. |
| *Proteus vulgaris* | 1,875 | Do. |
| *Shigella dysenteriae* | 234 | Do. |
| *Corynebacterium diphtheriae* (intermedius). | 20 | Difco Brain Heart Infusion. |
| *Streptococcus pyogenes* C203 | 10.5 | Do. |
| *Streptococcus faecalis* | 1,875 | Difco Penassay Broth. |
| *Bacillus subtilis* (Waksman) | 730 | Do. |
| *Clostridium septicum* | 22.5 | Fluid Thioglycollate. |
| *Brucella abortus* | 22.5 | Difco Brain Heart Infusion. |
| *Shigella typhosa* | 626 | Difco Penassay Broth. |
| *Shigella sonnei* | >1,875 | Do. |
| *Diplococcus pneumoniae*—type 2. | 6 | Difco Brain Heart Infusion. |
| *Diplococcus pneumoniae*—type 3. | 50 | Do. |

[a] Incubation temperature 37° C. unless otherwise noted.
[b] Triton A-20 is a surface-active agent, a 25% aqueous solution of an alkyl aryl polyether alcohol.

NOTE.—The in vitro spectrum of the concentrate form *Streptomyces venezuelae* WC3627 is substantially the same as that of the crystalline antibiotic.

Methymycin is, therefore, a physiologically active antibiotic which may be used in veterinary medicine. Because of the gram positive spectrum of methymycin, the antibiotic is of special utility in the control of bovine mastitis due to streptococcal or staphlococcal infections. For such purpose, it is administered in a suitable formulation, e.g., in an oleaginous vehicle of the type generally employed for instilling antimastitis medicaments directly through the test canal into the infected quarter.

Following are specific examples illustrative of the invention. However, these examples are not to be construed as limiting the invention.

EXAMPLE 1

A. *Preparation of inoculum.*—A culture of *Streptomyces venezuelae* WC3627, maintained on agar slants (either yeast-beef or soy infusion agar), is used. A transfer is made from a slant to a 500 ml. Erlenmeyer flask containing 100 ml. of the following medium: glucose, 2%; soybean meal, 1.5%; $CaCO_3$, 0.5%; NaCl, 0.1%; $CoCl_2 \cdot 6H_2O$, 0.0005%; tap water. The flask is incubated at 25° ±1° C. on a reciprocating shaker for 72 hours. A 10% transfer is made to each of three flasks containing 100 ml. of the above-mentioned medium and the flasks are incubated on the reciprocating shaker for 48 hours. The contents of the flasks are pooled and used as the inoculum in the fermentation described hereinafter.

B. *Fermentation.*—About 10 liters of a fermentation medium consisting essentially of soybean meal, 3.0%; NaCl, 0.1%; $CaCO_3$, 0.25%; $CoCl_2 \cdot 6H_2O$, 0.0005%; glucose, 2.0%; lard oil, 0.1%; tap water, in an 18.9 liter fermentation bottle, is sterilized for 30 minutes, minus the glucose, at 121° C. at one atmosphere gauge pressure. The glucose, which is added to the fermenter separately, is sterilized in concentrated form (220 gms./300 ml. water in a 500 ml. Erlenmeyer flask) for ½ hour at 121° C. at one atmosphere gauge pressure. To the fermenter, containing the fermentation medium, is added about 3% of a culture WC3627 inoculum. Sterile air is passed into the tank at the rate of about 25.5 liters/minute and the contents of the vessel are agitated by means of a 300 r.p.m. stirrer while tank temperature is maintained at 25°±1° C. Lard oil is added, as required, as an antifoam agent. After the fermentation has proceeded for 84 hours, the broth is acidified with $H_2SO_4$ (conc.) to pH 2–3, a filter aid (Hy-Flo) is added and the broth is filtered. This broth filtrate has a potency of about 2560 dilution units/ml. as measured against *Streptococcus pyogenes* C203 in a tube dilution assay.

C. *Preparation of antibiotic concentrate.*—The broth filtrate is adjusted to pH about 7.8, then extracted twice with 2.5 liter portions of peroxide-free ethyl ether. The ether is then allowed to evaporate from the ether extract in the presence of 650 ml. $H_2O$, kept slightly acid (pH 6.5) by addition of hydrochloric acid. The aqueous solution remaining is adjusted to pH 7.0 and lyophilized, resulting in isolation of the antibiotic concentrate (as the hydrochloride).

EXAMPLE 2

A. *Preparation of inoculum.*—A culture of *Streptomyces venezuelae* WC3627, maintained on agar slants (either yeast-beef or soy infusion agar , is used. A transfer is made from a slant to a 500 ml. Erlenmeyer flask containing 100 ml. of the following medium: glucose, 2%; soybean meal, 1.5%; $CaCo_3$, 0.5%; NaCl, 0.1%; $CoCl_2 \cdot 6H_2O$, 0.0005%; tap water. The flask is incubated at 25°±1° C. on a reciprocating shaker for 72 hours. The contents of the flask are then transferred to an aerated bottle (18.9 liters capacity) containing 12 liters of the following medium; glucose, 2.0%; soybean meal, 3.0%; NaCl, 0.1%; $CaCO_3$, 0.5%; 1% silicone (Dow-Corning) in mineral oil, 0.2%; tap water. Fermentation is allowed to proceed for 48 hours at 25°±1° C. while sterile air is passed through the fermentation liquor at the rate of one liter per liter of medium per minute. The contents of the bottle are then transferred to a germinator (378 liter capacity) containing 189 liters of the same medium as that used in the 18.9 liter fermentation described in Example 1, and incubation is allowed to proceed for 18–24 hours at 25°±1° C. with stirring at 120 r.p.m. aeration at 566 liters/minute and tank pressure at ⅔ atmosphere gauge presure. Then 75.6 liters of this incubation product are used to inoculate three kiloliters of the following fermentation medium (in a carbon-steel tank): soybean meal, 3%; NaCl, 0.1%; $CaCO_3$, 0.25%; $CoCl_2 \cdot 6H_2O$, 0.0005%; glucose, 2.0%; lard oil, 0.1%; tap water. Fermentation is then allowed to proceed for 84 hours at 25°±1° C. with stirring at 120 r.p.m., pressure at ⅔ atmosphere gauge and aeration by admission of sterile air at about 3400 liters/minute. During the fermentation, lard oil is added, as required, as an antifoam agent. After completion of the fermentation, the broth is acidified with $H_2SO_4$ (conc.), a filter aid (Hy-Flo) is added and the broth is filtered. The broth filtrate has a potency of about 100–150 du/ml. as measured against *Micrococcus pyogenes* var. *aureus,* and a potency of about 400–600 du/ml. as measured against *Streptococcus pyogenes* C203 in tube dilution assay.

B. *Preparation of antibiotic concentrate.*—The acidic broth filtrate is adjusted to pH 9.5 and then extracted (by continuous, counter-current extraction) with 1/10 volume of amyl acetate. The amyl acetate is then, in turn, extracted with 1/10 volume of dilute, aqueous sulfuric acid at pH 2.5. The aqueous extract is neutralized to pH 6.5 by passage through a column of IR–4B, an amine type anion-exchange resin (or by any other standard neutralization procedure) and freeze-dried to obtain the solid antibiotic as the concentrate (sulfate salt).

C. *Preparation of crystalline antibiotic.*—About 4.1 kiloliters of filtered broth at pH 9.5 is extracted continuously with amyl acetate. The resulting amyl acetate solution is extracted with dilute sulfuric acid at pH 2.5, and this dilute sulfuric acid solution is washed with 2.65 liters of chloroform, which is discarded; the dilute sulfuric acid solution is then adjusted to pH 9.5, then extracted twice, with 2.5 liter portions of chloroform. The 5 liters of chloroform extract are concentrated to one liter at 15°–20° C., and 10 liters of Skellysolve B (a hexane fraction, B.P. 86°–100° C.) is added gradually during agitation. The solution is agitated an additional two hours and stored at 5° C. overnight. Filtration yields 226.4 g. of crystals which are washed with Skellysolve B and dried in a desiccator 48 hours at room temperature to obtain about 183.4 g. crude crystals.

The crude crystals (free base) are dissolved in absolute ethanol for recrystallization. Four crops of crystals of methymycin (M.P. 195°–197° C.), total weight 132.8 g., are obtained by successive concentrations of the mother liquor.

*Methymycin hydrochloride.*—Obtained by dissolving an equivalent of the crystalline base in an equivalent of hydrochloric acid and lyophilizing the resulting solution.

*Methymycin sulfate.*—Obtained by dissolving equivalent amounts of the crystalline base and sulfuric acid in methanol. Evaporation of the solvent yields crude needles of the crystalline sulfate which can be recrystallized from a mixture of methanol and acetone. This water-soluble salt shows an ultraviolet absorption maximum at 230 mμ

$$E^{1\%}_{1\,cm.} = 160$$

and at 315 mμ

$$E^{1\%}_{1\,cm.} = 2.3$$

Calculated for $(C_{25}H_{43}O_7N)_2 \cdot H_2SO_4$: C, 57.91; H, 8.55; $SO_4$, 9.26. Found: C, 58.02; H, 8.59; $SO_4$, 9.36.

*Methymycin acid sulfate.*—Obtained by the addition of two equivalents of methanolic sulfuric acid to a solution of the base in methanol. Evaporation of the solvent leaves a gum which is crystallized by the addition of acetone.

Calculated for $C_{25}H_{43}O_7N \cdot H_2SO_4$: C, 52.89; H, 7.99; N, 2.47; $SO_4$, 16.92. Found: C, 52.73; H, 8.08; N, 2.73; $SO_4$, 16.98.

One milliliter of 0.01 N NaOH is required to neutralize 5.35 mg. (0.01 milimol) before carrying out the sulfate titration.

Using the procedure described in Examples 1 and 2, but with *Streptomyces venezuelae* WC3629 as a microorganism, the same isolated antibiotic, methymycin, as well as active concentrates thereof, are obtained.

This invention may be variously otherwise embodied within the scope of the appended claims.

We claim:

1. A compound selected from the group consisting of methymycin of the structural formula

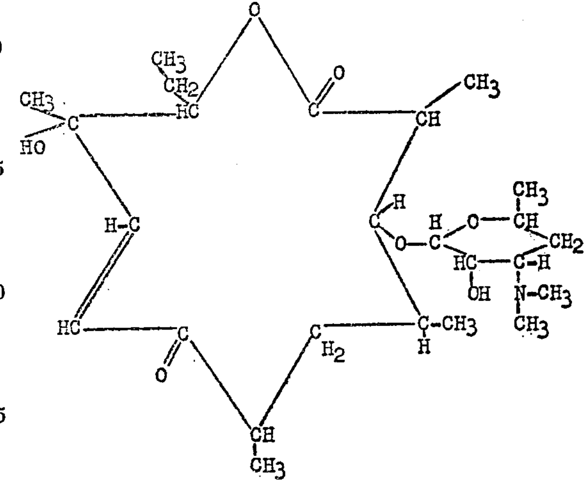

and acid-addition salts thereof.

2. Methymycin.

3. An acid-addition salt of methymycin.

4. Methymycin hydrochloride.

5. A sulfuric acid addition salt of methymycin.

6. A process for producing methymycin which comprises cultivating, under aerobic conditions, at least one member of the group consisting of *Streptomyces venezuelae* WC3627 and *Streptomyces venezuelae* WC3629, in an aqueous nutrient medium containing assimilable sources of carbon and nitrogen until substantial anti-microorganism activity is imparted to the culture liquid, and recovering the methymycin produced.

7. The process of claim 6 wherein the culture liquid is separated from the culture solids, and methymycin is recovered from the culture liquid.

8. The process of claim 6 wherein the microorganism is *Streptomyces venezuelae* WC3627.

9. The process of claim 6 wherein the microorganism is *Streptomyces venezuelae* WC3629.

References Cited in the file of this patent

UNITED STATES PATENTS 2,649,401 Haines et al. ------------ Aug. 18, 1953

OTHER REFERENCES

Waksman et al.: Actinomycetes and Their Antibiotics (1953), pp. 11, 12, 20, 21, 25, 27, 54, 55, 63, 65, 71, 185, 186, 188, 190, 201 and 228.

Max et al.: Antibiotics and Chemotherapy, June 1954, page 83.

Perlman et al.: Antibiotics and Chemotherapy, August 1954, pp. 894–898.

Hesseltine et al.: Annals of The New York Academy of Sciences, vol. 60, pp. 136–151 (October 20, 1954).

Sokolski et al.: Antibiotics and Chemotherapy, October 1954, pp. 1057–1059.

Donin et al.: Antibiotic Annual, 1953–1954, pp. 179–189.

Djerassi et al. 78, J.A.C.S., pp. 2907–2908, June 20, 1956.